US011467562B2

(12) United States Patent
Xiong et al.

(10) Patent No.: US 11,467,562 B2
(45) Date of Patent: Oct. 11, 2022

(54) ONLINE MONITORING DEVICE AND SYSTEM FOR A 3D PRINTING DEVICE

(71) Applicants: INSTITUTE OF AUTOMATION, CHINESE ACADEMY OF SCIENCES, Beijing (CN); CLOUD COMPUTING CENTER CHINESE ACADEMY OF SCIENCES, DongGuan, Guangdong (CN), Dongguan (CN)

(72) Inventors: Gang Xiong, Beijing (CN); Jiawei Liao, Beijing (CN); Zhen Shen, Beijing (CN); Xiuqin Shang, Beijing (CN); Chao Guo, Beijing (CN); Jun Yan, Beijing (CN); Can Luo, Beijing (CN); Xiao Wang, Beijing (CN); Feiyue Wang, Beijing (CN)

(73) Assignees: INSTITUTE OF AUTOMATION, CHINESE ACADEMY OF SCIENCES, Beijing (CN); CLOUD COMPUTING CENTER CHINESE ACADEMY OF SCIENCES, DongGuan, Guangdong (CN), Dongguan (CN)

( * ) Notice: Subject to any disclaimer, the term of this patent is extended or adjusted under 35 U.S.C. 154(b) by 351 days.

(21) Appl. No.: 16/921,945

(22) Filed: Jul. 7, 2020

(65) Prior Publication Data
US 2021/0011457 A1 Jan. 14, 2021

(30) Foreign Application Priority Data
Jul. 11, 2019 (CN) .......................... 201910626520.6

(51) Int. Cl.
G05B 19/4099 (2006.01)
G06F 3/12 (2006.01)
G05B 23/02 (2006.01)

(52) U.S. Cl.
CPC ..... *G05B 19/4099* (2013.01); *G05B 23/0224* (2013.01); *G06F 3/121* (2013.01);
(Continued)

(58) Field of Classification Search
CPC ............ G05B 19/4099; G05B 23/0224; G05B 2219/31354; G05B 2219/33296;
(Continued)

(56) References Cited

U.S. PATENT DOCUMENTS

2019/0178755 A1 6/2019 Lee et al.

FOREIGN PATENT DOCUMENTS

CN 104203547 A 12/2014
CN 105094720 A 11/2015
(Continued)

OTHER PUBLICATIONS

Wu Haixi, Study of the monitoring technique and its application for additive manufacturing based on acoustic emission, Chinese Doctorate Theory Full text database project Science and Technology Series II, 2017, 130 pages.

*Primary Examiner* — Huo Long Chen
(74) *Attorney, Agent, or Firm* — Bayramoglu Law Offices LLC

(57) ABSTRACT

An online monitoring device of 3D printing equipment includes a signal collection module, a signal processing module, a feature extraction module, a monitoring module and a knowledge base module. A vibration signal of a preset component of the 3D printing equipment is collected by a vibration sensor. The collected vibration signal of each preset component is converted from an analog signal to a
(Continued)

digital signal and the spectrum characteristics are extracted. Based on the spectrum characteristics of each preset component, the operation state type of the preset component is obtained by a comparative analysis model. The knowledge base module is configured to store newly added samples and initial samples of the 3D printing equipment. The initial samples include spectrum characteristic information and corresponding fault category of known faults, and the newly added samples include spectrum characteristic information and corresponding fault category of new faults.

22 Claims, 6 Drawing Sheets

(52) U.S. Cl.
CPC .. *G06F 3/1234* (2013.01); *G05B 2219/31354* (2013.01); *G05B 2219/33296* (2013.01); *G05B 2219/33318* (2013.01); *G05B 2219/37435* (2013.01); *G05B 2219/37597* (2013.01)

(58) Field of Classification Search
CPC .......... G05B 19/3318; G05B 19/37435; G05B 19/37597; G05B 2219/37432; G05B 2219/49023; G05B 19/406; G06F 3/121; G06F 3/1234; G06F 3/1285; B33Y 50/02; G06N 3/0045; G06N 5/022; G06N 3/0472; G06N 3/088; B29C 64/393
See application file for complete search history.

(56) References Cited

FOREIGN PATENT DOCUMENTS

| CN | 105619818 A | 6/2016 |
| CN | 108127913 A | 6/2018 |
| CN | 109397703 A | 3/2019 |
| CN | 109968671 A | 7/2019 |

ONLINE MONITORING DEVICE AND SYSTEM FOR A 3D PRINTING DEVICE

CROSS REFERENCE TO THE RELATED APPLICATIONS

This application is based upon and claims priority to Chinese Patent Application No. 201910626520.6, filed on Jul. 11, 2019, the entire contents of which are incorporated herein by reference.

TECHNICAL FIELD

The present invention is related to the technical field of three-dimensional (3D) printing equipment, and more particularly, to an online monitoring device and system of 3D printing equipment.

BACKGROUND 3D printing technology, also known as additive manufacturing or rapid prototyping technology, is one of the representative technologies of the possible third industrial revolution. It is based on the digital three-dimensional model, and it completes the processing of parts by layer stacking, which is essentially different from the traditional cutting processing technology, also known as the subtractive manufacturing. 3D printing, with its unique additive processing method, has been applied in an increasing number of industries. At present, there are various types of 3D printing equipment on the market to serve various needs. However, there are still challenges in the stability of existing 3D printing equipment, such as motor stalling, bearing fracture, transmission fault, abnormal machine shaking and other failure forms. In view of the high cost of 3D printing equipment, it is necessary to avoid irreparable damage to the 3D printing equipment caused by serious faults.

There are two kinds of maintenance methods for 3D printing equipment, that is, breakdown maintenance (BM) and preventive maintenance (PM). BM refers to an equipment maintenance management method that the 3D printing equipment is maintained and repaired only when failed or obviously occurring an abnormal operation state, which is only applicable to the situation where the consequences of the failure are minor and there are spare parts. PM is a regular maintenance management method, which ignores operating conditions and performance state of each equipment, and easily leads to over maintenance and insufficient maintenance. At present, there is no device on the market to identify the early abnormal operation state of 3D printing equipment, as well as, to identify the fault category and fault location of 3D printing equipment.

Therefore, it is desirable for the 3D printing equipment to develop an online monitoring and fault diagnosis device to solve the problem of irreparable damage to the 3D printing equipment which is caused by serious fault because the abnormal operation state cannot be recognized and the shutdown protection cannot be performed in the early stage of the abnormal operation state of the 3D printing equipment. In addition, the new online monitoring and fault diagnosis device is also required to solve the problem that the fault category and fault location cannot be identified in time when the fault occurs in the 3D printing equipment.

SUMMARY

In order to solve the problem of irreparable damage to the 3D printing equipment which is caused by serious fault because the user cannot identify the abnormal operation state in the early stage of the abnormal operation state of 3D printing equipment, the present invention provides an online monitoring device of 3D printing equipment, which includes a signal collection module, a signal processing module, a feature extraction module, a monitoring module and a knowledge base module.

The signal collection module includes a vibration sensor arranged on a preset component of the 3D printing equipment, and the vibration sensor is configured to collect vibration signals of the preset component during an operation of the 3D printing equipment.

The signal processing module is configured to convert the collected vibration signals of the preset component from analog signals to digital signals.

The feature extraction module is configured to extract spectrum characteristics of the digital signals of the vibration signals of each preset component separately to obtain the spectrum characteristics of each preset component.

The monitoring module is configured to obtain an operation state type of each preset component through a first comparative analysis model based on the spectrum characteristics of each preset component. The first comparative analysis model includes one or more judgment models in one-to-one correspondence with the preset component, and the judgment models are used to determine a correlation degree between the spectrum characteristics extracted from the preset component and spectrum characteristics of the preset component in a normal operation state, to obtain the operation state type of a corresponding component.

The knowledge base module is configured to store newly added samples and initial samples of the 3D printing equipment. The initial samples are spectrum characteristic information and corresponding fault categories of all kinds of known faults, and the newly added samples include spectrum characteristic information and corresponding fault categories of new faults acquired during the operation of the 3D printing equipment in real time.

In some preferred embodiments, the first comparative analysis model further includes a voting model corresponding to $2N+1$ judgment models of the preset component, and the voting model is used to take more than or equal to $N+1$ identical judgment results as a final operation state type of the preset component according to $2N+1$ judgment results output by the $2N+1$ judgment models.

Specifically, N is a positive integer greater than or equal to 1.

In some preferred embodiments, the operation state type is an abnormal operation state or a normal operation state.

In some preferred embodiments, when the operation state type is the abnormal operation state, the monitoring module determines a correlation degree between spectrum characteristics of the preset component in the abnormal operation state and spectrum characteristics of the preset component in the knowledge base module:

when the correlation degree is higher than a preset threshold, the monitoring module outputs a fault type;

when the correlation degree is lower than the preset threshold, the knowledge base module takes spectrum characteristics of vibration signals of a new fault as a newly added sample.

In some preferred embodiments, the online monitoring device of the 3D printing equipment further includes a fault early warning module.

The fault early warning module is configured to output control information when the operation state type of the preset component output by the monitoring module is the abnormal operation state, and the control information is used to stop the 3D printing equipment from printing.

In some preferred embodiments, the knowledge base module updates the initial samples based on the newly added samples.

In some preferred embodiments, the online monitoring device of the 3D printing equipment further includes an information display module.

The information display module includes a displayer and a touch screen, and is configured to present the operation state type output by the monitoring module to a user, and to perform human-computer interaction with the user.

In some preferred embodiments, a feature extraction method of the feature extraction module includes time-frequency analysis, power spectrum analysis and cepstrum analysis.

In some preferred embodiments, the preset component is at least one selected from the group consisting of a bearing pedestal, a motor, a transmission component, a box and a rack of the 3D printing equipment.

In some preferred embodiments, the vibration sensor is a piezoelectric vibration acceleration sensor or an eddy current displacement sensor.

The present invention also provides an online monitoring system of 3D printing equipment, which includes the online monitoring device of the 3D printing equipment mentioned above and a remote server. The remote server communicates with online monitoring devices of a plurality of 3D printing equipment through a wireless communication link to obtain the spectrum characteristic information and corresponding fault categories of the new faults in the newly added samples of an online monitoring device of each 3D printing equipment, and synchronize to the initial samples of the online monitoring device of each 3D printing equipment.

In some preferred embodiments, the remote server includes a sample database, and the sample database includes the initial samples and the newly added samples.

The initial samples are spectrum characteristic information and corresponding fault categories/fault types of all kinds of known faults, and the newly added samples are spectrum characteristic information and corresponding fault categories/fault types of new faults acquired during operations of the 3D printing equipment in real time.

The remote server updates the initial samples based on the newly added samples to obtain updated initial samples and synchronizes the updated initial samples to the initial samples of the online monitoring device of the 3D printing equipment.

The present invention also provides an online monitoring device of 3D printing equipment, which includes a signal collection module, a signal processing module, a time-frequency domain transformation module, a monitoring module and a knowledge base module.

The signal collection module includes a vibration sensor arranged on a preset component of the 3D printing equipment, and the vibration sensor is configured to collect vibration signals of the preset component during an operation of the 3D printing equipment.

The signal processing module is configured to convert the collected vibration signals of the preset component from analog signals to digital signals.

The time-frequency domain transformation module is configured to perform time-frequency domain transformation on the digital signals of the vibration signals of each preset component separately to obtain time-frequency information data of each preset component.

The monitoring module is configured to obtain an operation state type of each preset component through a second comparative analysis model based on the time-frequency information data of each preset component. The second comparative analysis model includes one or more deep learning algorithm-based classifiers in one-to-one correspondence with the preset component, and the deep learning algorithm-based classifier is configured to classify and identify an operation state type of a corresponding component based on the vibration signals of each preset component.

The knowledge base module is configured to store newly added samples and initial samples of the 3D printing equipment. The initial samples include time-frequency information data and corresponding operation state categories of all kinds of known operation states, and the newly added samples include time-frequency information data and corresponding operation state categories of new operation states acquired during the operation of the 3D printing equipment in real time.

In some preferred embodiments, the classifiers are constructed based on a restricted Boltzmann machine, and output categories include a fault type, an abnormal operation state and a normal operation state.

In some preferred embodiments, the online monitoring device of the 3D printing equipment further includes a fault early warning module.

The fault early warning module is configured to output control information when the monitoring module outputs a fault type or an abnormal operation state for the operation state type of the preset component, and the control information is used to control the 3D printing equipment to stop printing.

In some preferred embodiments, the online monitoring device of the 3D printing equipment further includes a comparative analysis model updating module, and the comparative analysis model updating module includes a third comparative analysis model.

The comparative analysis model updating module is configured to optimize the third comparative analysis model based on the newly added samples in the knowledge base module, obtain updated model parameters, and synchronize the obtained updated model parameters to the second comparative analysis model. A structure of the third comparative analysis model is identical to a structure of the second comparative analysis model.

In some preferred embodiments, the online monitoring device of the 3D printing equipment further includes an information display module.

The information display module includes a displayer and a touch screen, and is a human-computer interface that displays the operation state type output by the monitoring module to a user.

In some preferred embodiments, a signal transformation method of the time-frequency domain transformation module includes wavelet transformation and short-time Fourier transformation.

In some preferred embodiments, the preset component is at least one selected from the group consisting of a bearing pedestal, a motor, a transmission component, a box and a rack of the 3D printing equipment.

In some preferred embodiments, the vibration sensor is a piezoelectric vibration acceleration sensor or an eddy current displacement sensor.

The present invention also provides an online monitoring system of 3D printing equipment, which includes an online monitoring device of 3D printing equipment mentioned above and a remote server. The remote server communicates with online monitoring devices of a plurality of 3D printing equipment through a wireless communication link to obtain the newly added samples of an online monitoring device of each 3D printing equipment, and update parameters of the second comparative analysis model.

In some preferred embodiments, the remote server includes a sample database and a third comparative analysis model.

The sample database includes the initial samples and the newly added samples of the second comparative analysis model. The newly added samples are the time-frequency information data and the corresponding operation state categories of a new operation state type acquired during the operation of the 3D printing equipment in real time.

The structure of the third comparative analysis model is identical to the structure of the second comparative analysis model. A model training is performed again when the newly added samples are obtained from the sample database, and updated model parameters are obtained and synchronized to the second comparative analysis model.

Some advantages of the present invention: by reasonably arranging the vibration sensor, collecting the vibration signals of the 3D printing equipment, determining the operation state and fault type of the 3D printing equipment through the signal processing and analysis method and the fault diagnosis technology, the present invention can monitor the running operation state of the 3D printing equipment in real time, perform state identification and shutdown protection for the 3D printing equipment in the early stage of the abnormal operation state, thereby effectively avoiding the irreparable damage to the 3D printing equipment caused by serious fault, and when the fault occurs, it can identify the fault category and fault location in time.

BRIEF DESCRIPTION OF THE DRAWINGS

Other features, purposes and advantages of the present invention will become more apparent by reading the detailed description of the non-limiting embodiments with reference to the following drawings.

DETAILED DESCRIPTION OF THE EMBODIMENTS

Figure 1:
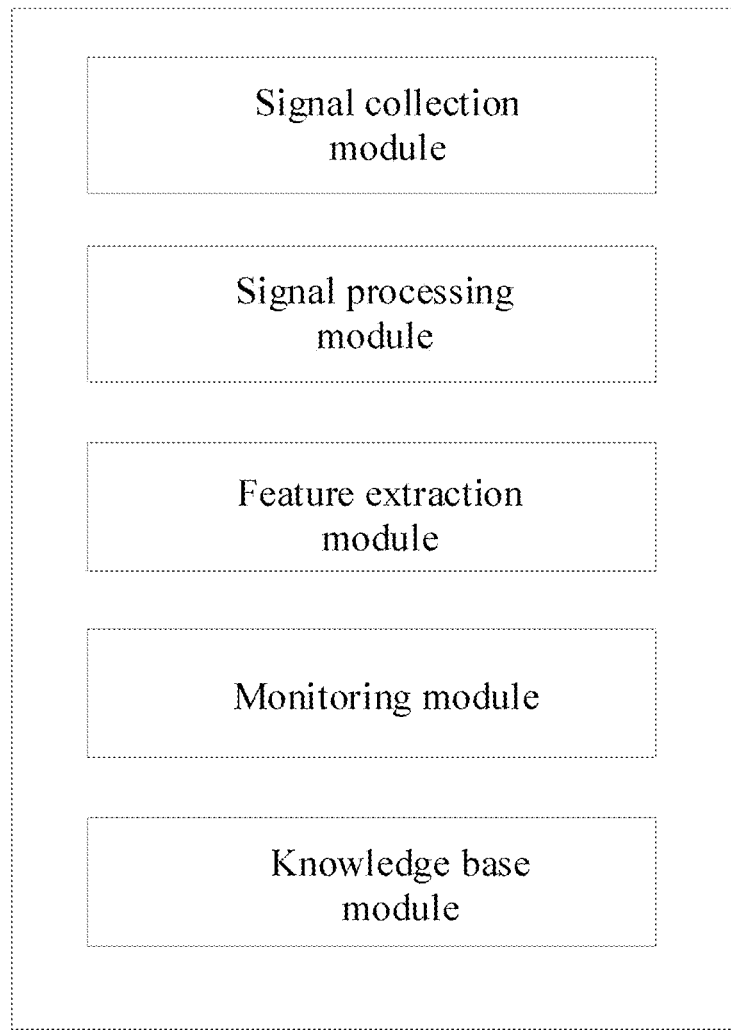
FIG. 1 is a structural diagram of an online monitoring device of 3D printing equipment according to an embodiment of the present invention.

In order to make the purpose, technical scheme and advantages of the present invention clearer, the technical solutions in the embodiments of the present invention will be described clearly and completely in combination with the drawings. Obviously, the described embodiments are part of the embodiments of the present invention, not all of them. Based on the embodiments of the present invention, all other embodiments obtained by those having ordinary skill in the art without creative labor shall fall within the scope of protection of the present invention.

The present invention will be further described in detail with reference to the drawings and embodiments. It is understood that the specific embodiments described herein are only used to explain the related invention and not to limit the invention. In addition, it should be noted that for the convenience of description, only parts related to the present invention are shown in the drawings.

It should be noted that the embodiments in the present invention as well as the features in the embodiment can be combined with each other in case of no conflict.

A correlation judgment-based online monitoring device of 3D printing equipment in the embodiment of the present invention is described, and an online monitoring system of 3D printing equipment including the correlation judgment-based online monitoring device of the 3D printing equipment and a remote server is described. Additionally, a deep learning-based online monitoring device of 3D printing equipment in the embodiment of the present invention is described, and an online monitoring system of 3D printing equipment including the deep learning-based online monitoring device of the 3D printing equipment and a remote server is described.

1. Correlation Judgment-Based Online Monitoring Device of 3D Printing Equipment

An online monitoring device of 3D printing equipment according to the embodiment of the present invention, as shown in FIG. 1, includes a signal collection module, a signal processing module, a feature extraction module, a monitoring module and a knowledge base module.

The signal collection module includes a vibration sensor arranged on a preset component of the 3D printing equipment, and the vibration sensor is configured to collect vibration signals of the preset component during an operation of the 3D printing equipment.

The signal processing module is configured to convert the collected vibration signals of each preset component from analog signals to digital signals.

The feature extraction module is configured to extract spectrum characteristics of the digital signals of the vibration signals of each preset component separately to obtain the spectrum characteristics of each preset component.

The monitoring module is configured to obtain an operation state type of each preset component through a first comparative analysis model based on the spectrum characteristics of each preset component, wherein the first comparative analysis model includes one or more judgment models in one-to-one correspondence with the preset component, and the judgment models are used to determine a correlation degree between the spectrum characteristics extracted from the preset component and the spectrum characteristics of the preset component in a normal operation state, to obtain an operation state type of a corresponding component.

The knowledge base module is configured to store newly added samples and initial samples of the 3D printing equipment, wherein the initial samples are spectrum characteristic information and corresponding fault categories of all kinds of known faults, and the newly added samples include spectrum characteristic information and corresponding fault categories of new faults acquired during the operation of the 3D printing equipment in real time.

In order to describe the present invention more clearly, an embodiment of the correlation judgment-based online monitoring device of 3D printing equipment is described in detail below from two aspects of composition module and working process.

1.1 Composition Module

Figure 2:
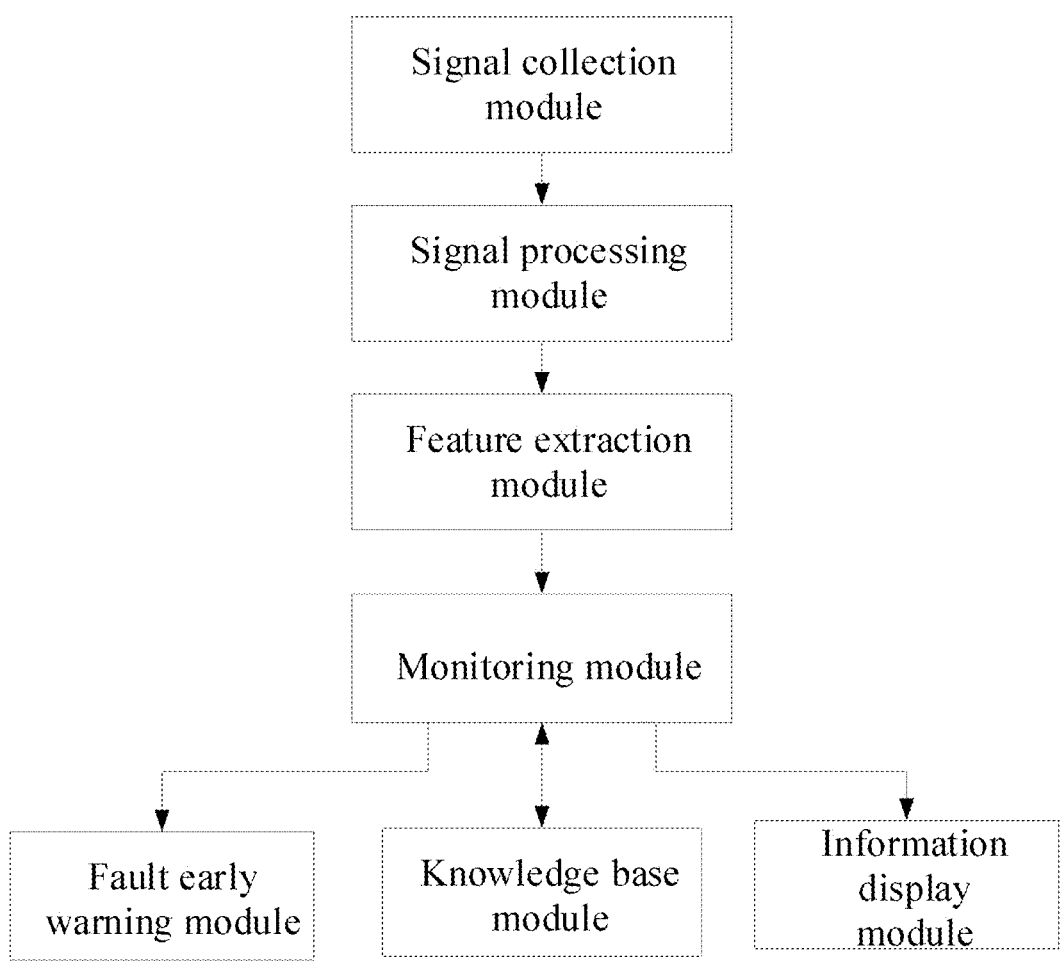
FIG. 2 is a system composition diagram of a correlation judgment-based online monitoring device of 3D printing equipment according to an embodiment of the present invention.

As shown in FIG. 2, the correlation judgment-based online monitoring device of 3D printing equipment includes a signal collection module, a signal processing module, a feature extraction module, a monitoring module, a knowledge base module, a fault early warning module, and an information display module.

1.1.1 Signal Collection Module

The online monitoring device of 3D printing equipment performs state monitoring and fault diagnosis on the 3D printing equipment through vibration signals. The vibration signals are sent out by the printing equipment itself, and there is no need to add another signal source. During the operation of the 3D printing equipment, a vibration occurs due to an impact of moving components and static components. A vibration level of the 3D printing equipment in the normal operation state is stable, and its vibration frequency is dominated by one-octave and two-octave. When a fault occurs, the vibration level of the 3D printing equipment in the abnormal operation state increases, and vibration characteristic frequency and vibration characteristic parameters of the fault are noticeable. Different fault categories have their own unique fault characteristic indexes, which effectively reflect faults of the 3D printing equipment.

The signal collection module is connected to the signal processing module to convert the collected vibration signals into output electrical signals. The signal collection module includes a vibration sensor. The vibration sensor is a piezoelectric vibration acceleration sensor or an eddy current displacement sensor according to different requirements. The vibration sensor may be arranged on a bearing pedestal, a motor, a transmission component, a box or a rack of the 3D printing equipment to extract vibration signals effectively representing the state of the 3D printing equipment.

1.1.2 Signal Processing Module

The signal processing module is connected to the signal collection module and the feature extraction module, and the signal processing module includes a filter and an analog-to-digital converter.

The filter is configured to retain different frequency bands and perform properly filtering and noise reduction on signals. The faults of the 3D printing equipment are reflected in the different frequency bands of vibration signals. According to the set different frequency band ranges, a low-pass filter, a high-pass filter, a band-pass filter or a combination of several filters may be used to retain required vibration frequency bands.

The analog-to-digital converter is configured to convert the vibration signals from analog signals to digital signals, which converts analog signals collected by the signal collection module into digital signals for signal analysis. The specific type of the analog-to-digital converter can be an integral converter or a voltage-frequency converter.

1.1.3 Feature Extraction Module

The feature extraction module is connected to the signal processing module and the monitoring module, respectively. The digital signal received from the signal processing module is converted from a time domain to a frequency domain by an embedded processor or a microprocessor to obtain a required digital signal spectrum, which is prepared for the subsequent state monitoring and fault diagnosis based on spectrum analysis.

Transformation from the time domain to the frequency domain includes Fourier transformation, short-time Fourier transformation, fast Fourier transformation and wavelet transformation. Frequency domain information with a high accuracy can be provided by various types of the Fourier transformation, which is a pure frequency domain algorithm. In order to retain time information simultaneously and determine the time when a specific signal occurs, the time-varying signal is processed, and the wavelet transformation is used to make a processed signal have a dual resolution of time and frequency at the same time.

Signal spectrum analysis method includes a time-frequency analysis method, a power spectrum analysis method and a cepstrum analysis method.

Based on time-domain digital signals, signal features are extracted by the time-frequency analysis method. The vibration signals of the 3D printing equipment are generally non-stationary signals under variable working conditions and load conditions. The time-frequency analysis method can effectively process non-stationary vibration signals caused by random slip, potential revolving speed fluctuation and load ratio variation. The analysis method combines time domain and frequency domain, it has the sensitivity of time domain analysis method in determining early faults and the accuracy of frequency domain analysis method in judging fault locations and fault types. It analyzes how the spectrum of the signal changes with time and monitors the state of the 3D printing equipment based on time-frequency spectrum. Specifically, empirical mode decomposition is performed on the collected vibration signals to obtain a plurality of intrinsic mode function (IMF) components, Hilbert transformation is performed on the plurality of intrinsic mode function (IMF) components to extract characteristic information of a state signal and identify its state type. A time-frequency diagram of the 3D printing equipment in the normal operation state is generally a stable random waveform. When the 3D printing equipment has different types of faults, its signal amplitude increases in varying degrees, and a waveform changes in different frequency bands according to a fault type, with obvious periodic or irregular impact and burr; energy in the different frequency bands increases significantly, and a position where the energy is most concentrated also changes, which can be used to determine whether the 3D printing equipment is in a normal operation state or not.

The power spectrum analysis method is to perform feature extraction of the power or energy distribution on processed vibration signals on a power spectrum, and process the vibration signals by the Fourier transformation of an auto-correlation function. The power spectrum analysis is clear and characteristic value is obvious. Since it reflects a square of a signal amplitude, a processor has to perform a lot of calculations.

The cepstrum analysis method, also known as a secondary spectrum analysis method, is to perform a comparative analysis on the processed vibration signal on the cepstrum based on frequency components of vibration signals of the 3D printing equipment. The complex family side band is simplified to a single spectrum line, which is convenient for extraction and analysis of effective characteristic parameters. Specifically, the Fourier transformation is performed to a logarithm of a vibration signal power spectrum, and then a convolution decomposition is performed, so that a complex convolution relationship is transformed into a simple linear superposition, and vibration signal features are extracted.

In practical applications, other analysis methods can also be adopted to extract signal features, which will not be repeated herein.

In the present embodiment, the feature extraction module obtains three kinds of spectrum characteristics of the vibration signal of a component from one digital signal output by the signal processing module by the time-frequency analysis method, the power spectrum analysis method and the cepstrum analysis method, respectively.

1.1.4 Monitoring Module

The monitoring module is connected to the feature extraction module, the knowledge base module, the fault early warning module and the information display module, respectively, and configured to obtain the operation state type of the component through a judgment model of a first comparative analysis model. Specifically, three kinds of spectrum characteristics of the digital signal of the same vibration signal are input into the three judgment models separately for the determination of a correlation degree with the spectrum characteristics of a component of the 3D printing equipment in the normal operation state, so as to obtain the operation state type of the component. The specific determination method is as follows:

when the correlation degree is higher than a threshold value, the monitoring module outputs a normal operation state; and when the correlation degree is lower than the threshold value, the monitoring module outputs an abnormal operation state.

The normal operation information data of the 3D printing equipment includes not only the basic parameters of healthy operation of the 3D printing equipment, but also the personalized health parameters of the monitored 3D printing equipment continuously collected during the early normal operation, so as to improve healthy operation information of the 3D printing equipment.

Correlation judgement is performed on the same vibration signal based on three spectrum characteristics to obtain three judgment results. Then, operation state judgement is performed on the three judgment results by a two-out-of-three voting model, and two identical results in the three judgment results are taken as a final operation state of the component.

The two-out-of-three voting model is the most reliable one of five security systems recommended by IEC61508. When the two-out-of-three voting model performs analyzing and comparing, it can only be assumed that all algorithms of the system are absolutely reliable, but there is bound to be a probability of error in an actual operation, and it will have a decisive impact on a reliability of the system. It can misjudge a state of the 3D printing equipment, resulting in false alarm situation.

Based on three judgment results of an operation state of the 3D printing equipment, the two-out-of-three voting model takes two identical judgment results in the three judgment results as a final operation state of the 3D printing equipment, which ensures that the 3D printing equipment can still operate normally and effectively in the case of occurring an error in a feature extraction. A fault tolerance and correction mechanism improve the reliability of the system, for example, in the case of occurring an error in a certain result, the online monitoring device of the 3D printing equipment is configured to accurately monitor and effectively diagnose the state of the 3D printing equipment.

When the voting model outputs an abnormal operation state, the monitoring module further judges the correlation degree between spectrum characteristics of the component in the abnormal operation state and fault spectrum characteristics of the component in the knowledge base module:

when the correlation degree is higher than a preset threshold, a typical fault, or known fault type, of the 3D printing equipment is determined, and the monitoring module outputs the fault type;

when the correlation degree is lower than the preset threshold, a new fault is determined, and meanwhile, characteristic information of the new fault is transferred to a newly added sample of the knowledge base module for storage, which is convenient for accurate diagnosis when a same type of fault occurs next time.

1.1.5 Knowledge Base Module

The knowledge base module stores newly added samples and initial samples of the 3D the printing equipment. The initial samples are spectrum characteristic information and corresponding fault categories of all kinds of known faults, and the newly added samples include spectrum characteristic information and corresponding fault categories of new faults acquired during the operation of the 3D printing equipment in real time. The knowledge base module is connected to the monitoring module and includes a microprocessor for neural network learning and a secure digital (SD) memory card for storing various types of fault information. The knowledge base module annotates and archives the known fault feature information as the initial samples; meanwhile, it archives the new fault information as newly added samples. Through continuous expansion of machine fault system, fault intelligent learning of the 3D printing equipment based on neural network and support vector machine is performed. The knowledge base module updates the initial samples continuously based on the newly added samples.

1.1.6 Fault Early Warning Module

The fault early warning module will give a fault early warning immediately when it receives "abnormal operation state" information of the 3D printing equipment output by the monitoring module. The fault early warning module outputs control information to control the 3D printing equipment to terminate a printing task while reminding the user, so as to avoid serious fault caused by continuing to operate and seriously damage to the 3D printing equipment.

1.1.7 Information Display Module

The information display module is connected to the monitoring module, and the information display module includes a displayer and a touch screen. The information display module is configured to present results obtained from the monitoring module, including fault early warning, fault location, fault type and other fault information, which is used for user interface, so that the user would be made aware of the fault categories and be provided with corresponding maintenance reference information.

1.2 Working Process

Figure 3:
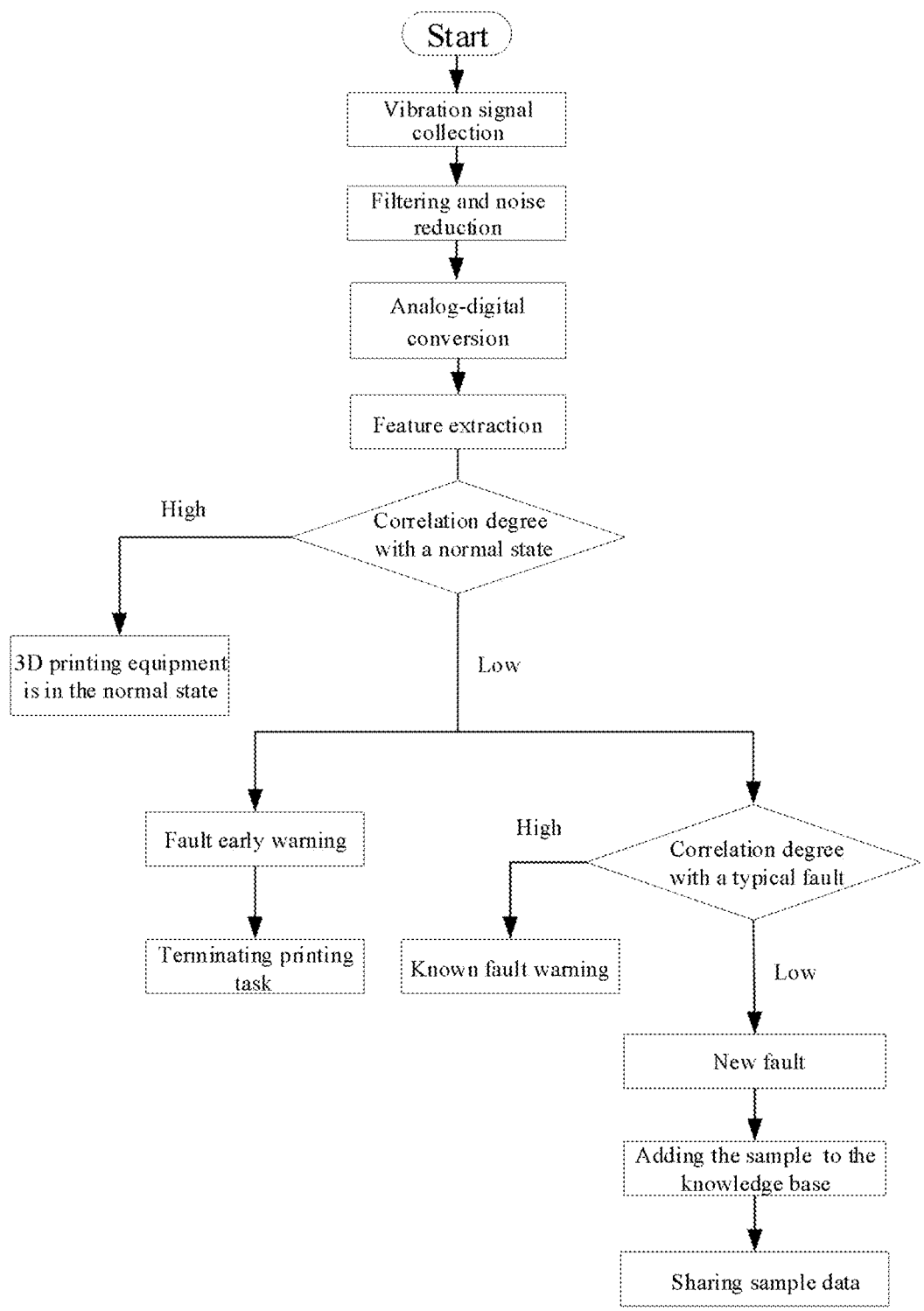
FIG. 3 is a working flow diagram of a correlation judgment-based online monitoring device of 3D printing equipment according to an embodiment of the present invention.

The working process of the online monitoring device of 3D printing equipment is shown in FIG. 3, including the following steps.

Step S11, vibration signal collection.

The signal collection of the 3D printing equipment in an operation state is performed by the vibration sensors arranged reasonably on the bearing pedestal, motor, transmission parts, box or rack of the 3D printing equipment.

Step S12, filtering and noise reduction.

Each vibration signal is filtered and denoised by the filter, which can improve the quality of the vibration signal while selecting the required signal frequency band.

Step S13, analog-to-digital conversion.

The analog-to-digital converter is configured to perform analog-to-digital conversion on the vibration signal. The analog signal collected by the signal collection module is converted into the digital signal for signal analysis.

Step S14, feature extraction: the digital signal received from the analog-to-digital converter is processed. The spectrum characteristics of each digital signal are extracted through signal transformation and signal analysis, so as to prepare for subsequent state monitoring.

When the voting model performs further judgment, a corresponding number of features are extracted according to the number of characteristic signals of a vibration signal necessarily extracted by the voting model.

Step S15, feature comparison.

Through the first comparative analysis model, an operation state type of a component is obtained. The spectrum characteristics of the component in the normal operation state input in advance and the monitored spectrum characteristics of the vibration signal are compared and analyzed through the judgment model, and the state of the 3D printing equipment is determined by the correlation degree between the signals. If the correlation degree is higher than a set threshold, the "normal operation state" information of the 3D printing equipment is output. If the correlation degree is lower than the set threshold, "abnormal operation state" information of the 3D printing equipment is output.

The voting model performs the correlation judge according to the 2N+1 spectrum characteristics of the same vibration signal, to obtain the 2N+1 operation states of the component, and takes N+1 or more identical states in the 2N+1 operation states as a final operation state type of the preset component. In the present embodiment, N=1, operation state judge is performed on three obtained judgment results through a two-out-of-three voting model, and two identical results in the three judgment results are taken as the final operation state of the component.

Step S16, fault early warning.

If the correlation degree between the monitored features in step S15 and the features of the 3D printing equipment in the normal operation state is lower than the set threshold, the fault early warning is performed, while the printing task is terminated by outputting control information to avoid serious fault caused by continuing to operate and seriously damage to the 3D printing equipment.

Step S17, fault diagnosis.

The correlation degree comparison between the characteristic parameters of the 3D printing equipment in the abnormal state and the fault spectrum characteristics in the initial samples in the knowledge base module is performed. If the correlation degree is higher than a set threshold, the fault type is output and an alarm is sent out. If the correlation degree is lower than the set threshold, a new fault is determined.

Step S18, knowledge base updating.

If the abnormal state information monitored is not in the initial samples of the knowledge base, the new fault information is archived. To update the knowledge base, the vibration information data of the 3D printing equipment in abnormal cases are recorded and input as cognitive conditions into the knowledge base for storage. When the similar abnormal vibration information is monitored subsequently, the relevant fault information is directly retrieved from the knowledge base, which effectively improves the recognition efficiency and the accuracy of state monitoring.

Step S19, data sharing.

The newly added samples are uploaded to the remote server in real time through 4G, 5G, Bluetooth, Wireless Fidelity (WiFi) and other wireless data transmission modes, so as to realize the data sharing within the local area network or wide area network, while samples shared by the remote server are obtained as the initial samples.

2. Online Monitoring System of 3D Printing Equipment

An online monitoring system of 3D printing equipment includes the correlation judgment-based online monitoring device of the 3D printing equipment and a remote server. The remote server includes a sample database, and the sample database includes initial samples and newly added samples. The initial samples are spectrum characteristic information and corresponding fault categories of all kinds of known faults, and the newly added samples are spectrum characteristic information and corresponding fault categories of new faults acquired during the operation of the 3D printing equipment in real time.

Figure 4:
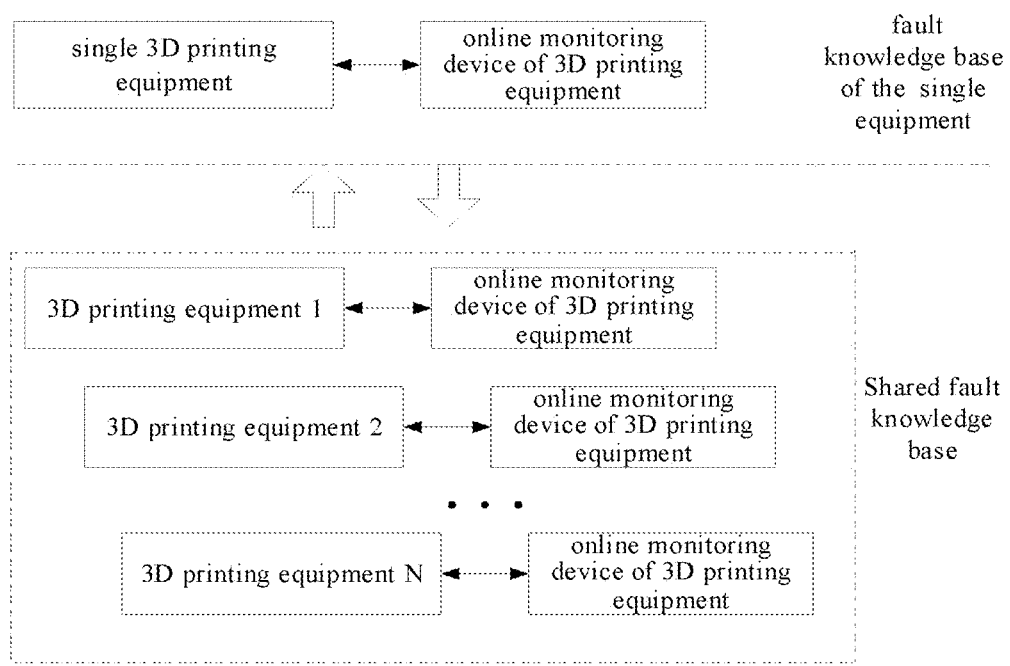
FIG. 4 is a schematic diagram of an online monitoring system knowledge base system of 3D printing equipment according to an embodiment of the present invention.

The remote server communicates with online monitoring devices of a plurality of 3D printing equipment through a wireless communication link. Sample data in the knowledge base is shared through a network, as shown in FIG. 4. The online monitoring device of each 3D printing equipment uploads the newly added samples to the remote server. The newly added samples include the spectrum characteristic information and the corresponding fault categories of the new faults. The remote server updates the initial samples based on the newly added samples to obtain the updated initial samples, and synchronizes the updated initial samples to the initial samples of the online monitoring device of each 3D printing equipment.

There may be a series of 3D printing equipment that perform different printing tasks in an assembly line in industrial mass production. The system of the present invention can collect a large number of sample data through data sharing every day and perform autonomous machine learning on them. With this mechanism, the sample database will have a great development.

The system of the present invention uses 5G wireless transmission technology, and with a help of traffic capacity and network efficiency of 5G network of 100 times that of 4G network, it can effectively transmit high-density and massive equipment state data in both directions.

3. Deep Learning-Based Online Monitoring Device of 3D Printing Equipment

An online monitoring device of 3D printing equipment includes a signal collection module, a signal processing module, a time-frequency domain transformation module, a monitoring module and a knowledge base module.

The signal collection module includes a vibration sensor arranged on a preset component of the 3D printing equipment, and the vibration sensor is configured to collect vibration signals of the preset component during an operation of the 3D printing equipment.

The signal processing module is configured to convert the collected vibration signals of each component from analog signals to digital signals.

The time-frequency domain transformation module is configured to perform time-frequency domain transformation on the digital signals of the vibration signals of each preset component separately to obtain time-frequency information data of each preset component.

The monitoring module is configured to obtain an operation state type of each preset component through a second comparative analysis model based on the time-frequency information data of each preset component, wherein the second comparative analysis model includes one or more deep learning algorithm-based classifiers in one-to-one correspondence with the preset component, and the deep learning algorithm-based classifier is configured to classify and identify an operation state type of a corresponding component based on the vibration signals of each preset component.

The knowledge base module is configured to store newly added samples and initial samples of the 3D printing equipment, wherein the initial samples are time-frequency information data and corresponding operation state categories of all kinds of known operation states, and the newly added samples include time-frequency information data and corresponding operation state categories of new operation states acquired during the operation of the 3D printing equipment in real time.

In order to describe the present invention more clearly, an embodiment of the deep learning-based online monitoring device of 3D printing equipment is described in detail below from three aspects of network model constructing and training, composition module and working process.

3.1 Network Model Constructing and Training

The network model is constructed based on restricted Boltzmann machine. Different vibration signals of the 3D printing equipment collected in real time are processed to obtain time-frequency information data as sample data. The data are randomly divided into training samples and test samples for training, which is based on the restricted Boltzmann machine.

In the sample data, the normal operation information date of the 3D printing equipment includes the basic parameters of healthy operation of the 3D printing equipment, as well as the personalized health parameters of the monitored 3D printing equipment continuously collected during the early normal operation. This improves the healthy operation information of the 3D printing equipment.

Through training and learning the characteristics of the data, multi-level and nonlinear feature extraction is realized, and the weak signal features are captured. Then, starting from the integrity and correlation, the residual is made with different types of fault information input in advance, and the intelligent fault diagnosis is realized by setting a threshold value. After the training, the network model can directly perform adaptive feature extraction and intelligent judgment of health state on signal time-frequency information data.

3.2 Composition Module of Online Monitoring Device of 3D Printing Equipment

Figure 5:
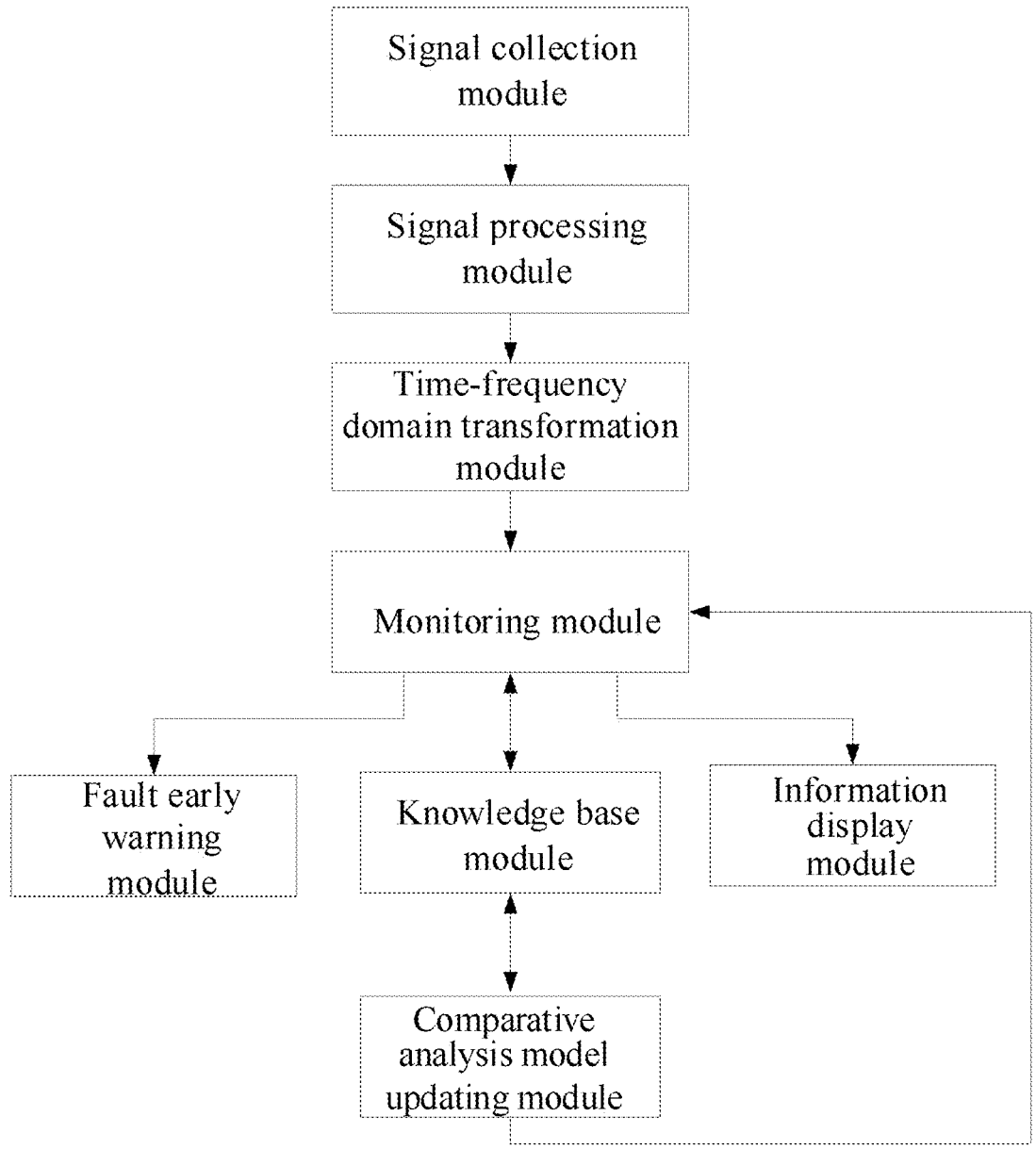
FIG. 5 is a system composition diagram of a deep learning-based online monitoring device of 3D printing equipment of an embodiment of the present invention.

The online monitoring device of the 3D printing equipment, as shown in FIG. 5, includes a signal collection module, a signal processing module, a time-frequency domain transformation module, a monitoring module, a knowledge base module, a fault early warning module, a comparative analysis model updating module and an information display module; wherein the signal collection module, the signal processing module and the information display module are the same as the corresponding modules of the correlation judgment-based online monitoring device of the 3D printing equipment, which are not described herein; only the time-frequency domain transformation module, the monitoring module, the knowledge base module, the fault early warning module and the comparison analysis model updating module are described.

3.2.1 Time-Frequency Domain Transformation Module

The time-frequency domain transformation module is connected to the signal processing module and the monitoring module, respectively, and is configured to perform signal transformation on the digital signal output, by the signal processing module, to obtain the time-frequency information data of the vibration signal.

The time-frequency domain transformation module converts the digital signal received from the signal processing module from the time domain to the frequency domain by an embedded processor or a microprocessor to obtain the required time-frequency spectrum of the digital signal.

The transformation method from time domain to frequency domain includes a short-time Fourier transformation and a wavelet transformation. In order to retain time information and determine a time when a specific signal occurs, the time-varying signal is processed using a signal processing method that is either a short-time Fourier transformation or a wavelet transformation, which is used to make the processed signal to have the dual resolution of time and frequency at the same time. In the present embodiment, the time-frequency spectrum of the vibration signal is obtained by the wavelet transformation.

3.2.2 Monitoring Module

The monitoring module is configured to obtain an operation state type of each component through a second comparative analysis model based on the time-frequency information data of each component. The second comparative analysis model includes one or more deep learning algorithm-based classifiers in one-to-one correspondence with each component. The classifiers are configured to classify and identify an operation state type of a corresponding component based on the vibration signal of each component. The second comparative analysis model performs state monitoring and fault diagnosis of the 3D printing equipment through the deep learning method. Deep learning network model directly extracts characteristic indexes in the time-frequency information through training, compares and determines the operation state of the 3D printing equipment accurately, and extracts the hidden features in the data maximumly, and performs effective comparison through accurate extraction of feature information when the characteristic parameters are discrete and incomplete. The second comparative analysis model is further optimized based on the newly added samples in the knowledge base module, and through the combination strategy of pre-training and fine adjusting, the model does not depend on the quality of the extracted feature information, and can still be improved after reaching a relatively high discrimination accuracy.

3.2.3 Knowledge Base Module

The knowledge base module is connected to the monitoring module, and it includes a microprocessor for neural network learning and a secure digital (SD) memory card for storing various types of operation state information. The knowledge base module annotates and archives the time-frequency information of all kinds of known operation states as the initial samples; additionally, it archives new operation state information as newly added samples. Through the continuous expansion of machine fault system, fault intelligent learning of the 3D printing equipment based on neural network and support vector machine is performed. After the second comparative analysis model is further optimized based on the newly added samples in the knowledge base module, the newly added samples in the knowledge base module are stored in the initial samples, and the initial samples are updated.

3.2.4 Fault Early Warning Module

When receiving the "abnormal operation state" information or fault type information of the 3D printing equipment output by the monitoring module, the fault early warning module will give a fault early warning immediately. The fault early warning module outputs control information to control the 3D printing equipment to terminate the printing task while reminding the user, so as to avoid serious faults caused by continuing to operate and seriously damage to the 3D printing equipment.

3.2.5 Comparative Analysis Model Updating Module

The comparative analysis model updating module includes a third comparative analysis model. The third comparative analysis model performs model optimization based on the newly added samples in the knowledge base module to obtain the updated model parameters, and synchronizes the updated model parameters to the second comparative analysis model. Specifically, the structure of the third comparative analysis model is identical to the structure of the second comparative analysis model.

3.3 Working Process of Online Monitoring Device of 3D Printing Equipment

Figure 6:
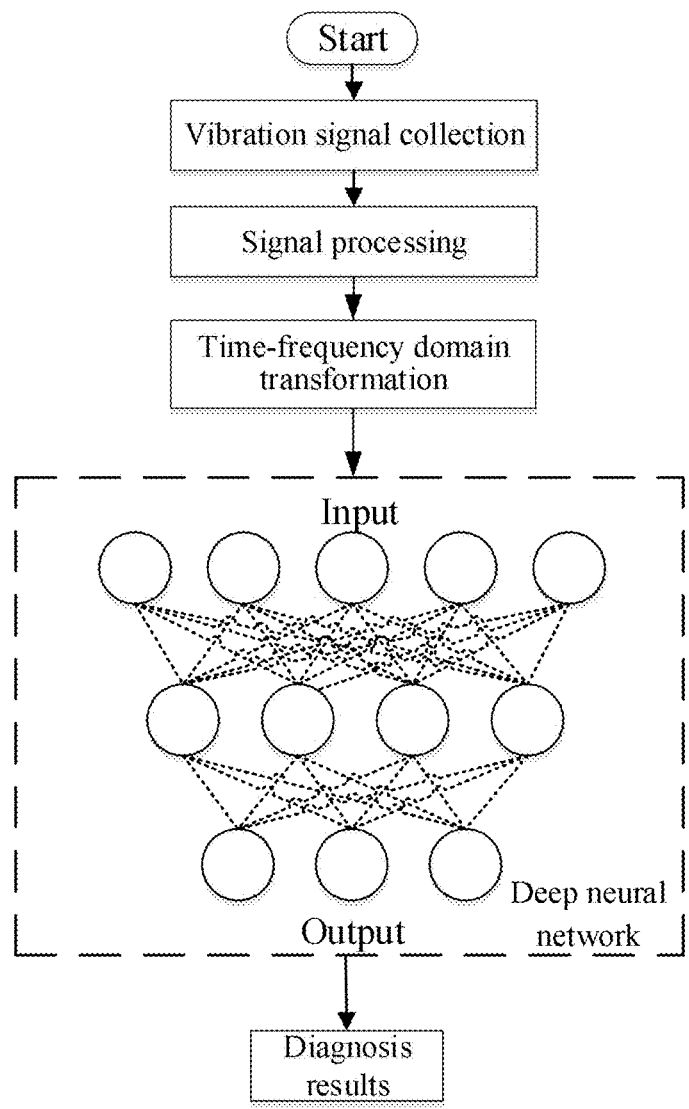
FIG. 6 is a working flow diagram of a deep learning-based online monitoring device of 3D printing equipment of an embodiment of the present invention.

The working process of online monitoring device of 3D printing equipment is shown in FIG. 6, including the following steps.

Step S21, vibration signal collection.

The vibration signal of the 3D printing equipment in an operation state is collected by the vibration sensor arranged reasonably on the bearing pedestal, motor, transmission parts, box or rack of the 3D printing equipment.

Step S22, signal processing.

The vibration signal is filtered and denoised by the filter, which can improve the quality of the vibration signal while selecting the required signal frequency band. The analog-to-digital converter is configured to perform analog-to-digital conversion on the vibration signal, and the analog signal collected by the signal collection module is converted into the digital signal for signal analysis.

Step S23, time-frequency domain transformation.

Time-frequency domain transformation is performed on the digital signal the vibration signal of each component to obtain the time-frequency information data of each component. In the present embodiment, the time-frequency spectrum of the vibration signal is obtained by the wavelet transformation.

Step S24, an operation state and a fault type of the 3D printing equipment are determined based on a deep neural network model.

The deep neural network model constructs based on a restricted Boltzmann machine is adopted to monitor the state and determines the fault types. The time-frequency information data is output by the time-frequency domain transformation module and is input into the network model, and the operation state and fault type of the 3D printing equipment are output as diagnosis results.

4. Online Monitoring System of 3D Printing Equipment

An online monitoring system of 3D printing equipment in the embodiment of the present invention includes the deep learning-based online monitoring device of the 3D printing equipment and a remote server. The remote server communicates with online monitoring devices of a plurality of 3D printing equipment through a wireless communication link to obtain the newly added samples of the online monitoring device of each 3D printing equipment and update parameters of the second comparative analysis model.

The remote server includes a sample database and a third comparative analysis model. The sample database includes initial samples and newly added samples of the second comparative analysis model, wherein the newly added samples are the time-frequency information data and the corresponding operation state categories of a new operation state acquired during the operation of the 3D printing equipment in real time.

The structure of the third comparative analysis model is identical to the structure of the second comparative analysis model. The third comparative analysis model is constructed based on a depth neural network, performs model training again when the newly added samples are obtained by the sample database to obtain updated model parameters, and synchronizes the updated model parameters to the second comparative analysis model.

The online monitoring device of 3D printing equipment collects vibration signals of the 3D printing equipment in real time, and performs state monitoring and fault diagnosis on the 3D printing equipment. When there are newly added samples in the knowledge base module, they are uploaded to the sample database of the remote server through 4G, 5G network, Bluetooth, WiFi and other wireless data transmission modes, so that the newly added samples of each independent printing device equipment are shared and the knowledge base feature set type is expanded.

It should be noted that the online monitoring device and system of 3D printing equipment provided in the above embodiments are only exemplified by the division of the above functional modules. In practical applications, the above functions may be allocated to be completed by different functional modules as needed, that is, the modules or steps in the embodiments of the present invention are further decomposed or combined. For example, the modules in the above embodiments can be merged into one module, or can be further split into a plurality of sub-modules to complete all or a part of the functions of the above description. The names of the modules and steps involved in the embodiments of the present invention are only to distinguish each module or step, and are not regarded as an improper limitation of the present invention.

Those skilled in the art should be able to realize that the exemplary modules and steps described in conjunction with the embodiments disclosed herein can be implemented by electronic hardware, computer software or a combination of the electronic hardware and the computer software. The programs corresponding to software modules and steps can be stored in a random access memory (RAM), a memory, a read-only memory (ROM), an electrically programmable ROM, an electrically erasable programmable ROM, a register, a hard disk, a removable disk, a compact disc-read only memory (CD-ROM), or any other form of storage medium well-known in the technical field. In order to clearly illustrate the interchangeability of electronic hardware and software, in the above description, the composition and steps of each embodiment have been generally described according to the functions. Whether these functions are performed by electronic hardware or software depends on specific applications and design constraints of the technical solution. Those skilled in the art may use different methods to implement the described functions for each specific application, but such implementation should not be considered to be beyond the scope of the present invention.

The terms "first", "second" and the like are used to distinguish similar objects, but not to describe or indicate a specific order or sequence.

The term "include/comprise" or any other similar terms are intended to cover non-exclusive inclusions, so that a process, article or apparatus/device including a series of elements not only includes those elements but also includes other elements that are not explicitly listed, or further includes elements inherent in the process, article or apparatus/device.

Hereto, the technical solutions of the present invention have been described in combination with the preferred implementations with reference to the drawings. However, it is easily understood by those skilled in the art that the scope of protection of the present invention is obviously not limited to these specific embodiments. Without departing from the principle of the present invention, those skilled in the art can make equivalent modifications or replacements to related technical features, and the technical solutions obtained through these modifications or replacements shall fall within the scope of protection of the present invention.

What is claimed is:

1. An online monitoring device of 3D printing equipment, comprising a signal collection module, a signal processing module, a feature extraction module, a monitoring module and a knowledge base module; wherein
the signal collection module comprises a vibration sensor arranged on a preset component of the 3D printing equipment, wherein the vibration sensor is configured to collect a vibration signal of the preset component during an operation of the 3D printing equipment;
the signal processing module is configured to convert the vibration signal of the preset component from an analog signal to a digital signal;
the feature extraction module is configured to extract spectrum characteristic of the digital signal of the vibration signal of the preset component separately to obtain the spectrum characteristic of the preset component;
the monitoring module is configured to obtain an operation state type of the preset component through a first comparative analysis model based on the spectrum characteristic of the preset component, wherein the first comparative analysis model comprises one or more judgment models in one-to-one correspondence with the preset component, and the one or more judgment models are used to determine a correlation degree between the spectrum characteristic extracted from the preset component and spectrum characteristic of the preset component in a normal operation state, to obtain an operation state type of a corresponding component; and
the knowledge base module is configured to store newly added samples and initial samples of the 3D printing equipment, wherein the initial samples are spectrum characteristic information and corresponding fault category of known faults, and the newly added samples comprise spectrum characteristic information and corresponding fault category of new faults acquired during the operation of the 3D printing equipment in real time.

2. The online monitoring device according to claim 1, wherein the first comparative analysis model further comprises a voting model corresponding to 2N+1 judgment models of the preset component, and the voting model is used to take at least N+1 identical judgment results as a final operation state type of the preset component according to 2N+1 judgment results output by the 2N+1 judgment models;
wherein, N is a positive integer greater than or equal to 1.

3. The online monitoring device according to claim 1, wherein the operation state type is an abnormal operation state or a normal operation state.

4. The online monitoring device according to claim 3, wherein, when the operation state type is the abnormal operation state, the monitoring module determines the correlation degree between the spectrum characteristic of the preset component in the abnormal operation state and the spectrum characteristic of the preset component in the knowledge base module, wherein,
when the correlation degree is higher than a preset threshold, a fault type is output by the monitoring module; and
when the correlation degree is lower than the preset threshold, the knowledge base module takes spectrum characteristics of vibration signals of a new fault as a newly added sample.

5. The online monitoring device according to claim 3, further comprising a fault early warning module;
the fault early warning module is configured to output control information when the operation state type of the preset component output by the monitoring module is the abnormal operation state, and the control information is used to control the 3D printing equipment to stop printing.

6. The online monitoring device according to claim 3, further comprising an information display module; wherein
the information display module comprises a displayer and a touch screen, wherein the displayer is configured to present the operation state type output by the monitoring module to a user, and to perform human-computer interaction with the user.

7. The online monitoring device according to claim 1, wherein the knowledge base module updates the initial samples based on the newly added samples.

8. The online monitoring device according to claim 1, wherein a feature extraction method of the feature extraction module comprises time-frequency analysis, power spectrum analysis, and cepstrum analysis.

9. The online monitoring device according to claim 1, wherein the preset component is at least one selected from the group consisting of a bearing pedestal, a motor, a transmission component, a box and a rack of the 3D printing equipment.

10. The online monitoring device according to claim 1, wherein the vibration sensor is a piezoelectric vibration acceleration sensor or an eddy current displacement sensor.

11. An online monitoring system of the 3D printing equipment, comprising the online monitoring device according to claim 1 and a remote server; wherein the remote server communicates with online monitoring devices of multiple pieces of 3D printing equipment through a wireless communication link to obtain the spectrum characteristic information and the corresponding fault categories of the new faults in the newly added samples of the online monitoring device of each of the multiple pieces of 3D printing equipment, and synchronize to the initial samples of the online monitoring device of each of the multiple pieces of 3D printing equipment.

12. The online monitoring system of 3D printing equipment according to claim 11, wherein the remote server comprises a sample database, and the sample database comprises the initial samples and the newly added samples;
the initial samples are the spectrum characteristic information and the corresponding fault categories of the known faults, and the newly added samples are the spectrum characteristic information and the corresponding fault categories of the new faults acquired during the operation of the 3D printing equipment in real time;
the remote server updates the initial samples based on the newly added samples to obtain updated initial samples and synchronizes the updated initial samples to the initial samples of the online monitoring device of the 3D printing equipment.

13. An online monitoring device of 3D printing equipment, comprising a signal collection module, a signal processing module, a time-frequency domain transformation module, a monitoring module and a knowledge base module; wherein, the signal collection module comprises a vibration sensor arranged on a preset component of the 3D printing equipment, wherein the vibration sensor is configured to collect vibration signals of the preset component during an operation of the 3D printing equipment;

wherein the signal processing module is configured to convert collected vibration signals of the preset component from analog signals to digital signals;

wherein the time-frequency domain transformation module is configured to perform time-frequency domain transformation on the digital signals of the vibration signals of the preset component separately to obtain time-frequency information data of each preset component;

wherein the monitoring module is configured to obtain an operation state type of the preset component through a second comparative analysis model based on the time-frequency information data of the preset component, wherein the second comparative analysis model comprises one or more deep learning algorithm-based classifiers in one-to-one correspondence with the preset component, and the one or more deep learning algorithm-based classifier is configured to classify and identify an operation state type of a corresponding component based on the vibration signals of the preset component; and wherein the knowledge base module is configured to store newly added samples and initial samples of the 3D printing equipment, wherein the initial samples are time-frequency information data and corresponding operation state categories of all kinds of known operation states, and the newly added samples include time-frequency information data and corresponding operation state categories of new operation states acquired during the operation of the 3D printing equipment in real time.

14. The online monitoring device according to claim 13, wherein the one or more deep learning algorithm-based classifiers are constructed based on a restricted Boltzmann machine, wherein output classifications comprise a fault type, an abnormal operation state and a normal operation state.

15. The online monitoring device according to claim 14, wherein the online monitoring device further comprises a fault early warning module;

wherein the fault early warning module is configured to output control information when the operation state type of the preset component output by the monitoring module is the fault type or the abnormal operation state, and the control information is used to control the 3D printing equipment to stop printing.

16. The online monitoring device according to claim 13, wherein the online monitoring device further comprises a comparative analysis model updating module, and the comparative analysis model updating module comprises a third comparative analysis model;

wherein the comparative analysis model updating module is configured to optimize the third comparative analysis model based on the newly added samples in the knowledge base module, wherein updated model parameters are obtained and synchronized to the second comparative analysis model, wherein a structure of the third comparative analysis model is identical to a structure of the second comparative analysis model.

17. The online monitoring device according to claim 13, wherein the online monitoring device further comprises an information display module;

wherein the information display module comprises a displayer and a touch screen, and the information display module is configured to present the operation state type output by the monitoring module to a user, and to perform human-computer interaction with the user.

18. The online monitoring device according to claim 13, wherein a signal transformation method of the time-frequency domain transformation module comprises wavelet transformation and short-time Fourier transformation.

19. The online monitoring device according to claim 13, wherein the preset component is at least one selected from the group consisting of a bearing pedestal, a motor, a transmission component, a box and a rack of the 3D printing equipment.

20. The online monitoring device according to claim 13, wherein the vibration sensor is a piezoelectric vibration acceleration sensor or an eddy current displacement sensor.

21. An online monitoring system of the 3D printing equipment, comprising an online monitoring device according to claim 13 and a remote server; wherein the remote server communicates with online monitoring devices of multiple pieces of 3D printing equipment through a wireless communication link to obtain the newly added samples of the online monitoring device of each of multiple pieces of 3D printing equipment and updates parameters of the second comparative analysis model.

22. The online monitoring system according to claim 21, wherein the remote server comprises a sample database and a third comparative analysis model;

wherein the sample database comprises the initial samples and the newly added samples of the second comparative analysis model; the newly added samples are the time-frequency information data and the corresponding operation state categories of a new operation state type acquired during the operation of the 3D printing equipment in real time;

wherein a structure of the third comparative analysis model is identical to a structure of the second comparative analysis model; wherein a model training is performed again when the newly added samples are obtained from the sample database, and updated model parameters are obtained and synchronized to the second comparative analysis model.

* * * * *